(12) United States Patent
Karamcheti et al.

(10) Patent No.: US 7,761,624 B2
(45) Date of Patent: Jul. 20, 2010

(54) SYSTEMS AND APPARATUS FOR MAIN MEMORY WITH NON-VOLATILE TYPE MEMORY MODULES, AND RELATED TECHNOLOGIES

(75) Inventors: Vijay Karamcheti, Los Altos, CA (US); Kumar Ganapathy, Los Altos, CA (US); Kenneth Alan Okin, Saratoga, CA (US); Rajesh Parekh, Los Altos, CA (US)

(73) Assignee: Virident Systems, Inc., Milpitas, CA (US)

( * ) Notice: Subject to any disclaimer, the term of this patent is extended or adjusted under 35 U.S.C. 154(b) by 0 days.

(21) Appl. No.: 11/848,013

(22) Filed: Aug. 30, 2007

(65) Prior Publication Data

US 2008/0082732 A1      Apr. 3, 2008

Related U.S. Application Data

(60) Provisional application No. 60/827,421, filed on Sep. 28, 2006.

(51) Int. Cl.
  *G06F 13/12*      (2006.01)
(52) U.S. Cl. .......................................... 710/62; 710/74
(58) Field of Classification Search .................. 710/62, 710/74
  See application file for complete search history.

(56) References Cited

U.S. PATENT DOCUMENTS

| | | | |
|---|---|---|---|
| 4,757,533 A | 7/1988 | Allen et al. | |
| 5,012,408 A | 4/1991 | Conroy et al. | |
| 5,379,401 A | 1/1995 | Robinson et al. | |
| 5,404,485 A | 4/1995 | Ban | |
| 5,701,438 A | 12/1997 | Bains | |
| 5,710,733 A | 1/1998 | Chengson et al. | |
| 6,088,750 A | 7/2000 | Beaman et al. | |
| 6,185,704 B1 | 2/2001 | Pawate et al. | |
| 6,393,545 B1 | 5/2002 | Long et al. | |
| 6,549,959 B1 | 4/2003 | Yates et al. | |
| 6,564,326 B2 | 5/2003 | Helbig, Sr. | |
| 6,765,812 B2 * | 7/2004 | Anderson | 365/51 |
| 6,785,780 B1 | 8/2004 | Klein et al. | |
| 6,970,968 B1 | 11/2005 | Holman | |

(Continued)

OTHER PUBLICATIONS

Martinez, David E., "Office Action in U.S. Appl. No. 11/847,986 Mailed May 12, 2009", , Publisher: USPTO, Published in: US.

(Continued)

*Primary Examiner*—Alford W Kindred
*Assistant Examiner*—David E Martinez
(74) *Attorney, Agent, or Firm*—Alford Law Group, Inc.; William E. Alford

(57) ABSTRACT

A computing system is disclosed that includes a memory controller in a processor socket normally reserved for a processor. A plurality of non-volatile memory modules may be plugged into memory sockets normally reserved for DRAM memory modules. The non-volatile memory modules may be accessed using a data communication protocol to access the non-volatile memory modules. The memory controller controls read and write accesses to the non-volatile memory modules. The memory sockets are coupled to the processor socket by printed circuit board traces. The data communication protocol to access the non-volatile memory modules is communicated over the printed circuit board traces and through the sockets normally used to access DRAM type memory modules.

6 Claims, 7 Drawing Sheets

U.S. PATENT DOCUMENTS

| | | | |
|---|---|---|---|
| 6,990,044 B2 * | 1/2006 | Kang | 365/235 |
| 7,034,955 B2 | 4/2006 | Bearss et al. | |
| 7,091,598 B2 | 8/2006 | Fujita et al. | |
| 7,196,554 B2 | 3/2007 | Taskin et al. | |
| 7,324,352 B2 | 1/2008 | Goodwin | |
| 2002/0017720 A1 | 2/2002 | Nishizawa et al. | |
| 2002/0051350 A1 | 5/2002 | Take | |
| 2002/0118593 A1 | 8/2002 | Takemae | |
| 2002/0133684 A1 | 9/2002 | Anderson | |
| 2002/0138600 A1 | 9/2002 | Singhal | |
| 2003/0090879 A1 | 5/2003 | Doblar et al. | |
| 2003/0137862 A1 | 7/2003 | Brunelle et al. | |
| 2003/0174569 A1 | 9/2003 | Amidi | |
| 2003/0188083 A1 | 10/2003 | Kumar | |
| 2004/0026791 A1 | 2/2004 | King et al. | |
| 2004/0117581 A1 | 6/2004 | Lee | |
| 2004/0160835 A1 | 8/2004 | Altman et al. | |
| 2004/0186948 A1 | 9/2004 | Lofgren | |
| 2004/0193783 A1 | 9/2004 | Sharma | |
| 2004/0236877 A1 | 11/2004 | Burton | |
| 2005/0044303 A1 | 2/2005 | Perego | |
| 2005/0166026 A1 | 7/2005 | Ware | |
| 2005/0235131 A1 | 10/2005 | Ware | |
| 2005/0240745 A1 | 10/2005 | Iyer et al. | |
| 2005/0251617 A1 | 11/2005 | Sinclair et al. | |
| 2005/0273570 A1 | 12/2005 | Desouter et al. | |
| 2005/0289317 A1 | 12/2005 | Liou | |
| 2006/0050488 A1 | 3/2006 | Goodwin | |
| 2006/0106984 A1 | 5/2006 | Bartley et al. | |
| 2006/0149857 A1 | 7/2006 | Holman | |
| 2006/0195631 A1 | 8/2006 | Rajamani | |
| 2006/0230250 A1 | 10/2006 | Klint et al. | |
| 2007/0016704 A1 * | 1/2007 | Harari et al. | 710/68 |
| 2007/0276977 A1 | 11/2007 | Coteus et al. | |
| 2008/0001303 A1 | 1/2008 | Yu et al. | |
| 2008/0024899 A1 | 1/2008 | Chu et al. | |
| 2008/0028186 A1 * | 1/2008 | Casselman | 712/37 |
| 2008/0082731 A1 | 4/2008 | Karamcheti et al. | |
| 2008/0082733 A1 | 4/2008 | Karamcheti | |
| 2008/0082734 A1 | 4/2008 | Karamcheti et al. | |
| 2008/0082750 A1 | 4/2008 | Okin et al. | |
| 2008/0082751 A1 | 4/2008 | Okin et al. | |
| 2008/0082766 A1 | 4/2008 | Okin et al. | |
| 2008/0094808 A1 | 4/2008 | Kanapathippillai et al. | |
| 2008/0115006 A1 | 5/2008 | Smith | |
| 2009/0210616 A1 | 8/2009 | Karamcheti et al. | |
| 2009/0210636 A1 | 8/2009 | Karamcheti et al. | |
| 2009/0254689 A1 | 10/2009 | Karamcheti et al. | |

OTHER PUBLICATIONS

Martinez, David E., "Office Action in U.S. Appl. No. 11/848,040 Mailed May 26, 2009", , Publisher: USPTO, Published in: US.

Martinez, David E., "Office Action in U.S. Appl. No. 11/848,083 Mailed May 5, 2009", , Publisher: USPTO, Published in: US.

Walter, Craig E., "Office Action in U.S. Appl. No. 11/864,763 Mailed Jun. 16, 2008", , Publisher: USPTO, Published in: US.

Eland, Shawn, "Office Action in U.S. Appl. No. 11/864,763 Mailed Sep. 16, 2009", , Publisher: USPTO, Published in: US.

Eland, Shawn, "Office Action in U.S. Appl. No. 11/864,763 Mailed Dec. 24, 2008", , Publisher: USPTO, Published in: US.

Nguyen, Hoa Cao, "Office Action in U.S. Appl. No. 11/876,479 Mailed Oct. 29, 2008", , Publisher: USPTO, Published in: US.

Cheung, Raymond, "AQ1207:MPC824x Architecture and Applications", "Smart Networks Developer Forum 2003 Asia", Oct. 20, 2003, Publisher: Motorola, Published in: US.

Connor, Deni, "Kmart shines its Blue Light on solid state disks", May 7, 2001, Publisher: itworld.com, Published in: US.

Lee, Hyung Gyu, "Energy Aware Memory Allocation in Heterogeneous Non-Volatile Memory Systems", Aug. 25, 2003, Publisher: Seoul National University, Published in: Korea.

Candea, George et al., "Microreboot A Technique for Cheap Recovery", 2004, Publisher: USENIX Association.

Thomas, Deborah A., "PCT/US07/080015 Written Opinion and Search Report Mailed Aug. 13, 2008".

Young, Lee W., "PCT/US09/33843 Written Opinion and Search Report Mailed Oct. 22, 2009".

Young, Lee W., "PCT/US07/79619 Written Opinion and Search Report Mailed Mar. 13, 2008".

Young, Lee W., "PCT/US07/079622 Written Opinion and Search Report Mailed Apr. 19, 2008".

Young, Lee W., "PCT/US07/82162 Written Opinion and Search Report Mailed Jun. 9, 2008".

Unknown Author, "3.5 in SATA SSD Drive", "www.SuperTalent.com", Aug. 17, 2007, pp. 13, Publisher: Super Talent Technology, Published in: US.

Tseng, Hung-Wei et al., "An Energy Efficient Virtual Memory System with Flash Memory as the Secondary Storage", "ISLPED '06", Oct. 4, 2006, pp. 418-423, Publisher: Dept. of CS and Info Engineering, National Taiwan University, Published in: Taipei, Taiwan.

Williams, Martyn, "Solid-state disks coming on strong", "Infoworld.com", Jun. 7, 2007, Publisher: Macworld, The Mac Experts, Published in: US.

* cited by examiner ures that include less than all of or alternatives for the detailed features and combinations set forth in these examples.

SYSTEMS AND APPARATUS FOR MAIN MEMORY WITH NON-VOLATILE TYPE MEMORY MODULES, AND RELATED TECHNOLOGIES

CROSS REFERENCE TO RELATED APPLICATIONS

This non-provisional United States (U.S.) patent application claims the benefit of U.S. Provisional Patent Application No. 60/827,421 entitled SUBSTITUTION OF A PROCESSOR WITH A BUILT IN DRAM MEMORY CONTROLLER BY A NON-DRAM MEMORY CONTROLLER TO CONTROL ACCESS TO NON-DRAM TYPE MEMORY MODULES filed on Sep. 28, 2006 by inventor Kumar Ganapathy et al.

FIELD

The document generally relates to memory controllers and memory modules.

BACKGROUND

Some computing systems use dynamic random access memory (DRAM) integrated circuits in their main memory. DRAM integrated circuits (ICs) retain information by storing a certain amount of charge on a capacitor in each memory cell to store a logical one or alternatively, a logical zero. Over time, and because of read operations, the stored charge on the capacitor dissipates, in a process often referred to as leaking off. To preserve the stored charge on a DRAM capacitor, and thus maintain the ability of the DRAM to maintain its memory contents, the stored charge in the memory cell may be increased through refresh cycles, which sometimes are performed periodically.

BRIEF DESCRIPTIONS OF THE DRAWINGS

DETAILED DESCRIPTION

In the following detailed description, numerous examples of specific implementations are set forth. However, implementations may include configurations that include less than all of or alternatives for the detailed features and combinations set forth in these examples.

For similar memory capacity, dynamic random access memory (DRAM) integrated circuits (ICs) typically consume more power than non-volatile memory integrated circuits, particularly when data is read. Non-volatile memory integrated circuits typically do not require refresh cycles and thus conserve power. To reduce power consumption in system applications with a main memory, a non-volatile memory integrated circuit may be used in place of or as a supplement to a DRAM integrated circuit.

Typically, a write access to non-volatile memory integrated circuits takes more time than a write access to DRAM integrated circuits. Some types of non-volatile memory integrated circuits, such as NOR FLASH EEPROM integrated circuits, may be configured with improved read access times (e.g., twice that of DRAM integrated circuits). In order to address differences between read and write performance, a data communication protocol may be used that accesses the non-volatile memory modules in a different manner than DRAM memory modules.

The following paragraphs describe how a non-DRAM memory controller and non-volatile memory modules may be introduced into or integrated by a computer system.

Figure 1:
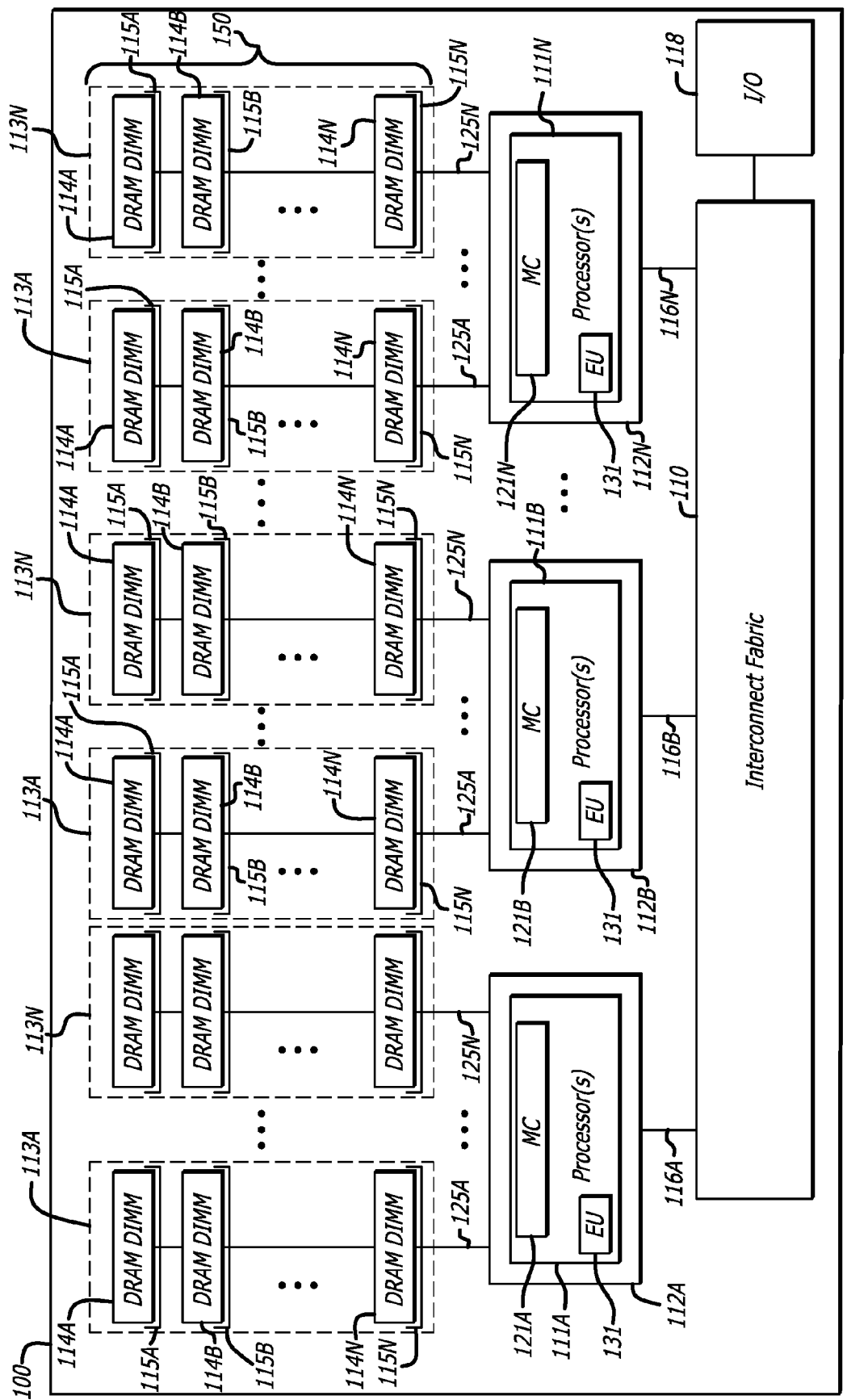
FIG. 1 is a functional block diagram of a computer system with only DRAM DIMMS.

Referring now to FIG. 1, a functional block diagram of a computer system is illustrated with dynamic random access memory (DRAM) type of dual in-line memory modules (DIMMS). The computer system includes a multi-processor motherboard 100. Mounted to the mother board 100 are a plurality of processor sockets 112A-112N. Additionally mounted to the mother board 100 are dual in-line memory module (DIMM) sockets 115A-115N in each of a plurality of memory channels 113A-113N. The plurality of memory channels 113A-113N are respectively coupled to each processor socket 112A-112N as illustrated via groups of printed circuit board traces 125A-125N.

One or more processors 111A-111N including built in DRAM type memory controllers 121A-121N may or may not be plugged into the processor sockets 112A-112N in any given system. For example, processor socket 112B may be vacant without any processor plugged therein.

Each processor socket 112A-112N has one or more connections to the interconnect fabric 110 that includes printed circuit board trace groups 116A-116N between the processor sockets 112A-112N and the interconnect fabric (which may or may not include additional integrated circuits) but which also connects to the input/output (I/O) circuitry 118. Groups of printed circuit board traces 125A-125N in each memory channel 113A-113N are coupled between the memory module sockets 115A-115N and the processor sockets 112A-112N.

A packaged processor 111A-111N includes one or more processing core elements (or execution units) 131 and one or more DRAM type memory controllers 121A-121N. The packaged processor 111A-111N may be plugged into any of the processor sockets 112A-112N. The memory controller 121A may furnish data to the processing core elements in the packaged processor 111A, for example, from some DRAM DIMM 114A-114N over one of the groups of printed circuit board traces 125A-125N coupled to socket 112A and (through the interconnect fabric 110) to other processors 111B-111N in their respective sockets 112B-112N. That is, the main memory formed by the plurality of memory channels 113A-113N coupled to each processor 111A-111N is a shared main memory 150 that is shared amongst the processors 111A-111N which are plugged into the processor sockets 112A-112N.

The DIMM sockets 115A-115N couple to a processor socket 112A-112N through groups of PCB traces 125A-

125N. If a processor socket is vacant, the DRAM DIMMS 114A-114N are probably not plugged into DIMM sockets 115A-115N of the one or more memory channels coupled to the vacant processor socket. That is, the DIMM sockets 115A-115N are likely to be vacant if the processor socket 112 to which they couple is vacant.

As discussed previously, there are groups of printed circuit board traces 125A-125N in each memory channel 113A-113N that are coupled between the memory module sockets 115A-115N and the processor sockets 112A-112N. With a processor 111A plugged into the corresponding processor socket 112A and the DRAM memory modules 114A-114N plugged into the memory module sockets 115A-115N, the groups of printed circuit board traces 125A-125N interconnect the processor 111A with the memory modules 114A-114N. Some of the groups of printed circuit board (PCB) traces 125A-125N between the processor socket and the memory module sockets are shared amongst all of the memory modules sockets in that channel. Some of the groups of printed circuit board traces 125A-125N between the processor socket 112A and the memory module sockets 115A-115N are not shared amongst all. There may be one or more printed board traces in the groups of printed circuit board traces 125A-125N that are uniquely routed between the processor socket and the memory module sockets 115A-115N. For example, a printed circuit board trace may be dedicated to providing a route between the processor socket 112 and the first memory module socket 115A, without being routed to the other memory module sockets 115B-115N in the memory channel.

The DRAM DIMMs 114A-114N plugged into the memory module sockets 115A-115N are printed circuit boards including a plurality of DRAM type memory integrated circuit chips mounted to the printed circuit board. The entirety or a subset of the plurality of DRAM type memory integrated circuit chips on a DIMM are accessed in parallel by the memory controller to read data from or write data to the memory.

Figure 2A:
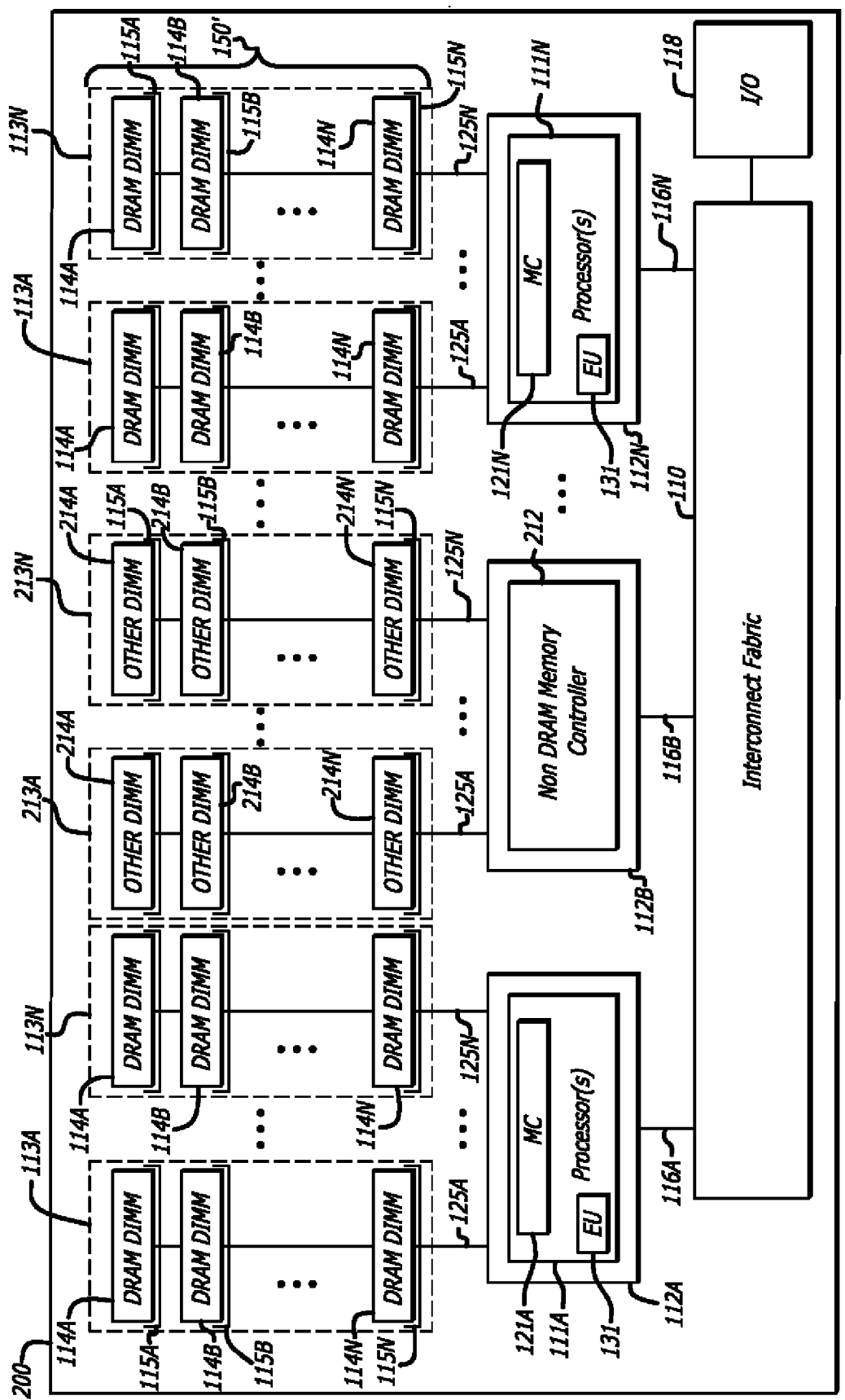
FIG. 2A is a functional block diagram of the computer system of FIG. 1 upgraded with a memory controller to control non-DRAM memory DIMMS.

Referring now to FIG. 2A, a functional block diagram of the computer system of FIG. 1 is illustrated as having been upgraded with a memory controller to control non-DRAM memory DIMMS, such as non-volatile memory modules. These non-DRAM type memory modules may help increase the memory capacity and/or reduce the power consumption of the system.

As discussed previously, one or more processor sockets 112A-112N on a mother board may be vacant. The vacancy in the processor socket may be from a user pulling out the processor from that socket. That is, the processor is unplugged by a user to generate the vacant processor socket. Alternatively, a processor may have not been plugged into the processor socket—it was originally vacant. Moreover, if the memory channels to be upgraded are not vacant of DRAM type memory modules, a user may unplug the DRAM-type memory modules to make all the memory module sockets in a memory channel available for non-DRAM type memory modules.

In FIG. 2A, the upgraded mother board 200 is illustrated. The upgraded mother board 200 has had one or more non-DRAM type memory controllers 212 plugged into a respective one or more processor sockets 112. In FIG. 2A, the non-DRAM type memory controller 212 is plugged into a previously vacant processor socket 112B so that the one or more memory channels 213A-213N coupled thereto can be used with memory modules having different types of memory integrated circuits other than DRAM integrated circuits to upgrade the shared main memory 150'.

The one or more memory channels 213A-213N are the memory channels used by the non-DRAM memory controller 212 to communicate to the non-DRAM memory modules 214A-214N. But for the non-DRAM memory modules 214A-214N, the structure of the one or more memory channels 213A-213N is substantially similar to the structure of the memory channels 113A-113N using the same groups of printed circuit board traces 125A-125N and sockets 115A-115N as before.

Each of the one or more memory channels 213A-213N includes a plurality of memory module sockets 115A-115N with non-DRAM memory modules 214A-214N plugged into the plurality of memory module sockets 115A-115N. The groups of printed circuit board traces 125A-125N in each of the one or more memory channel 213A-213N are coupled between the memory module sockets 115A-115N and the processor socket 112B.

While the structure of the groups of PCB traces (also referred to as "interconnects" herein) 125A-125N in each upgraded memory channel 213A-213N are the same, the signals propagating over one or more traces of the groups of PCB traces 125A-125N may differ to control the non-DRAM type memory modules 214A-214N. That is, the meaning of some signal lines in the pre-existing interconnections (e.g., groups of PCB traces 125A-125N) between the processor socket 112B and the memory module sockets 115A-115N in each upgraded memory channel 213A-213N may be changed to appropriately control the non-DRAM type memory modules 214A-214N.

A data strobe signal line used to access DRAM memory modules may change to be a feedback status control signal line that can be communicated from a non-volatile memory module to the memory controller to alleviate the non-deterministic nature of the erase and write operations in the non-volatile memory modules. With a feedback status control signal, the memory controller can avoid constantly polling the non-volatile memory module as to when an erase or write operation is completed.

For example, data strobe signals DQS13, DQS14, DQS15, DQS16 respectively change to status signals RY/BY_N_R1D0, RY/BY_N_R1D1, RY/BY_N_R1D2, RY/BY_N_R1D3 when a non-volatile memory module is being accessed within a memory module socket of a memory channel. The data strobe signals DQS13, DQS14, DQS15, DQS16 are used to clock data out each memory module in a DRAM memory channel. The RY/BY_N_R1D0, RY/BY_N_R1D1, RY/BY_N_R1D2, RY/BY_N_R1D3 signals are status signals for rank one memory of each of four DIMM modules/sockets that are in the memory channel. These status signals are fed back and coupled to the heterogeneous memory controller to more efficiently access the non-volatile memory module. Each status signal indicates whether or not a rank of memory in a memory module is busy or ready for another access to alleviate the non-deterministic nature of erase and write operations to non-volatile memory modules.

While one or more memory channels 213A-213N are upgraded to use non-DRAM type memory modules 214A-214N and the associated processor socket 112B is filled by a non-DRAM memory controller 212, the structure of the mother board 200 is similar to the structure of mother board 100. The prior discussion of elements of the mother board 100 having the same reference numbers on mother board 200 are incorporated here by reference for reasons of brevity.

Figure 2B:
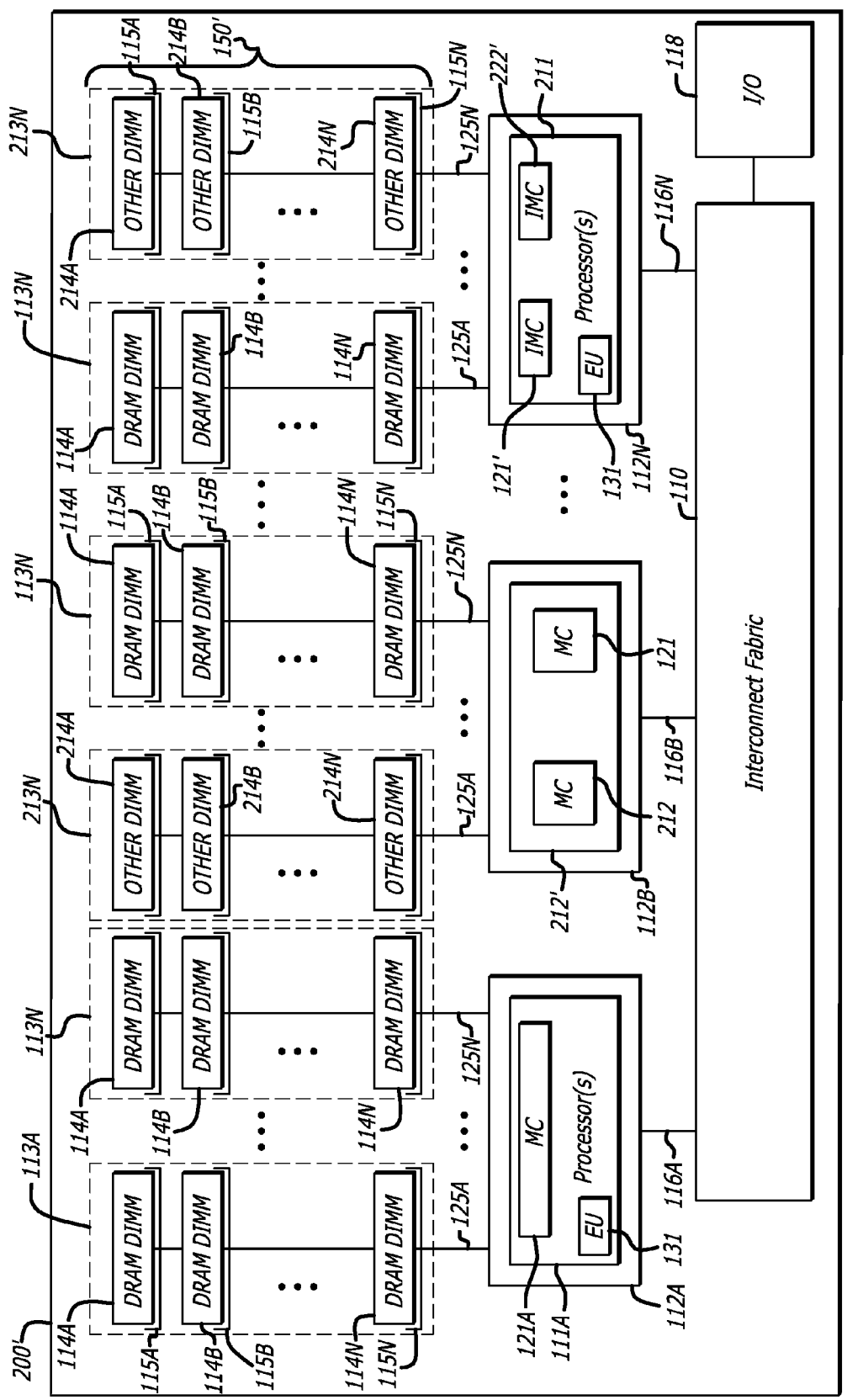
FIG. 2B is a functional block diagram of the computer system of FIG. 1 upgraded with dual memory controllers to control both DRAM memory DIMMS and non-DRAM memory DIMMS.

FIG. 2B is a functional block diagram of an upgraded computer system with a dual memory controller 212' plugged into a processor socket 112B of the mother board 200'. The dual memory controller 212' includes a non-DRAM memory controller 212 and a DRAM memory controller 121 co-packaged together to respectively control access to non-DRAM memory DIMMS 214A-214N plugged into sockets 115A-115N of the memory channel 213N and DRAM memory DIMMS 114A-114N plugged into sockets 115A-115N of the memory channel 113N. The dual memory controller 212' plugs into the processor socket 112B and couples to sockets 115A-115N in the memory channel 213N by printed circuit board traces 125A and to sockets 115A-115N in the memory channel 113N by printed circuit board traces 125N.

FIG. 2B further illustrates a functional block diagram of an upgraded computer system with a processor 211 having an execution unit (EU) 131, integrated DRAM memory controller (IMC) 121', and integrated non-DRAM memory controller (IMC) 222'. The processor 211 is plugged into a processor socket 112N of the mother board 200' and coupled to sockets 115A-115N in the memory channel 113N by printed circuit board traces 125A and to sockets 115A-115N in the memory channel 213N by printed circuit board traces 125N. The integrated non-DRAM memory controller 222' controls access to non-DRAM memory DIMMS 214A-214N plugged into sockets 115A-115N in the memory channel 213N. In one implementation, the integrated non-DRAM memory controller 222' is a non-volatile memory controller and the non-DRAM memory DIMMS 214A-214N are non-volatile memory DIMMS. The integrated DRAM memory controller 121' controls access to DRAM memory DIMMS 114A-114N plugged into sockets 115A-115N in the memory channel 113N.

Figure 5:
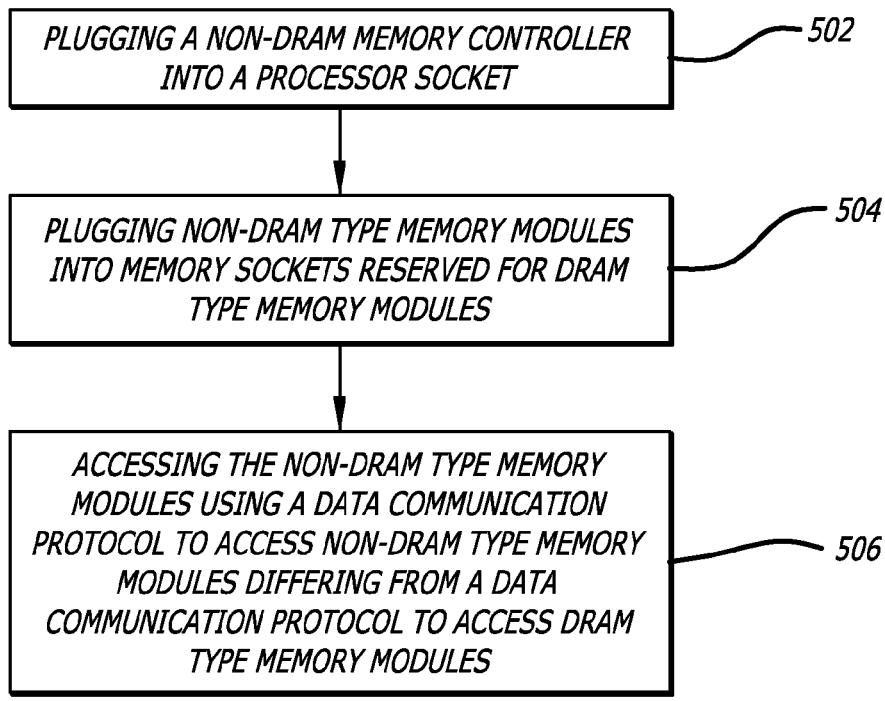
FIG. 5 is a flow chart of a method for upgrading a computing system.

Referring now to FIG. 5, a flow chart of a method for upgrading a computing system is illustrated.

At block 502, a non-DRAM memory controller is plugged into a processor socket normally reserved for a processor. If a processor was plugged into the processor socket, the processor may be removed prior to plugging in the memory controller. The memory controller plugged into the processor socket is used to control read and write accesses to non-DRAM memory modules (e.g., memory modules of a type other than DRAM memory modules) in the computing system. In one configuration, the non-DRAM memory modules is non-volatile memory modules.

At block 504, a plurality of non-DRAM memory modules are plugged into memory sockets normally reserved for DRAM memory modules. If DRAM memory modules were plugged into these memory sockets, they would be removed prior to plugging in the plurality of non-DRAM memory modules into the memory sockets. The memory sockets are coupled to the processor socket by pre-existing groups of printed circuit board traces so that the memory controller plugged into the processor socket can control read and write accesses to non-DRAM memory modules in the computing system.

In one configuration, the non-DRAM memory modules are non-volatile memory modules (e.g., memory modules of a type other than volatile memory modules). For instance, in one particular example, the non-volatile memory mounted to the non-volatile memory module is a NOR flash electrically erasable programmable read only memory (EEPROM).

At block 506, the non-DRAM memory modules are accessed via the memory controller in the processor socket by using a data communication protocol to access non-DRAM memory modules. The data communication protocol to access non-DRAM memory modules may be specific to the type of non-DRAM memory module plugged into the memory module sockets and may differ from the data communication protocol used to access DRAM memory modules. The data communication protocol to access non-DRAM memory modules is communicated over the groups of pre-existing printed circuit board traces and through the sockets normally used to access DRAM type memory modules. In one configuration, the non-DRAM memory modules are non-volatile types of memory modules. For example, data strobe signals may change to status signals when a non-volatile memory module is being accessed within a memory module socket of a memory channel.

Figure 3:
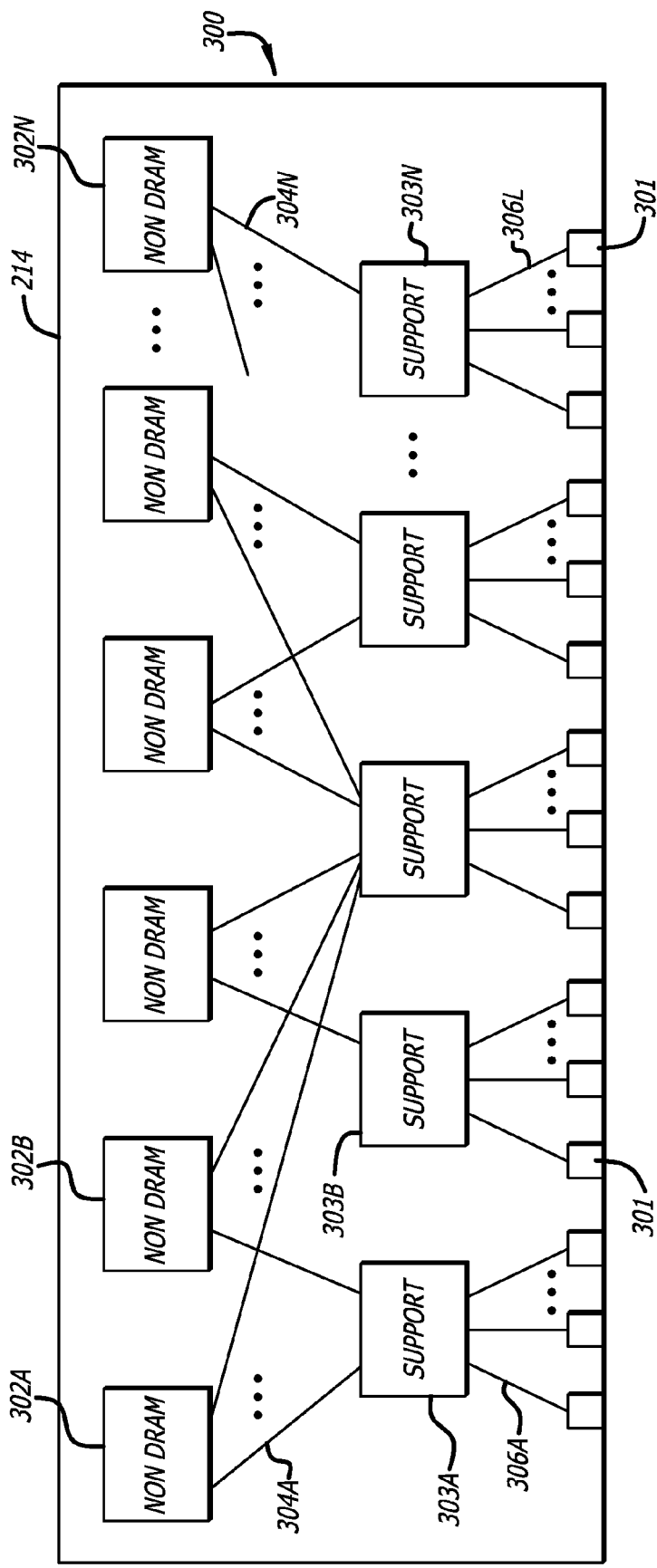
FIG. 3 is a functional block diagram of a non-DRAM memory module.

Referring now to FIG. 3, a functional block diagram of a non-DRAM memory module 214 is illustrated. The non-DRAM memory module 214 may be plugged into the memory module sockets 115A-115N of the one or more upgraded memory channels 213A-213N.

In one configuration, the non-DRAM memory module 214 is a non-volatile memory module. In this case, the non-DRAM memory controller 212 is a non-volatile memory controller. In particular, for example, the non-volatile memory module may include at least one NOR-gate flash electrically erasable programmable read only memory (EEPROM) integrated circuit.

The non-DRAM memory module 214 includes a printed circuit board 300 having pads of edge connectors 301 (one on each side for a DIMM) formed thereon, a plurality of non-DRAM memory chips 302A-302N, and a plurality of support chips 303A-303N. In another configuration, the plurality of support chips may be co-packaged with some of the non-DRAM memory chips 302A-302N into one IC package. The memory module 214 further includes a plurality of interconnects (e.g., package interconnects or printed circuit board traces) 304A-304N and 306A-306L formed on the PCB 300, providing a coupling between the non-DRAM memory chips 302A-302N and the support chips 303A-303N, and between the support chips 303A-303N and the pads of the edge connectors 301.

In one configuration, the memory module 214 is a dual in-line memory module (DIMM) and the printed circuit board (PCB) 300 is a DIMM PCB. The non-DRAM memory chips 302A-302N may be NOR FLASH EEPROM integrated circuit chips or some other kind of non-DRAM memory integrated circuit chips, such as non-volatile memory integrated circuit chips.

The plurality of support chips 303A-303N may be used to buffer addresses, and/or multiplex and de-multiplex data to and from the non-DRAM memory chips 302A-302N. The plurality of support chips 303A-303N may also be referred to herein as a plurality of buffer integrated circuits 303. The plurality of support chips 303A-303N may be co-packaged with some of the non-DRAM memory chips 302A-302N.

Figure 6A:
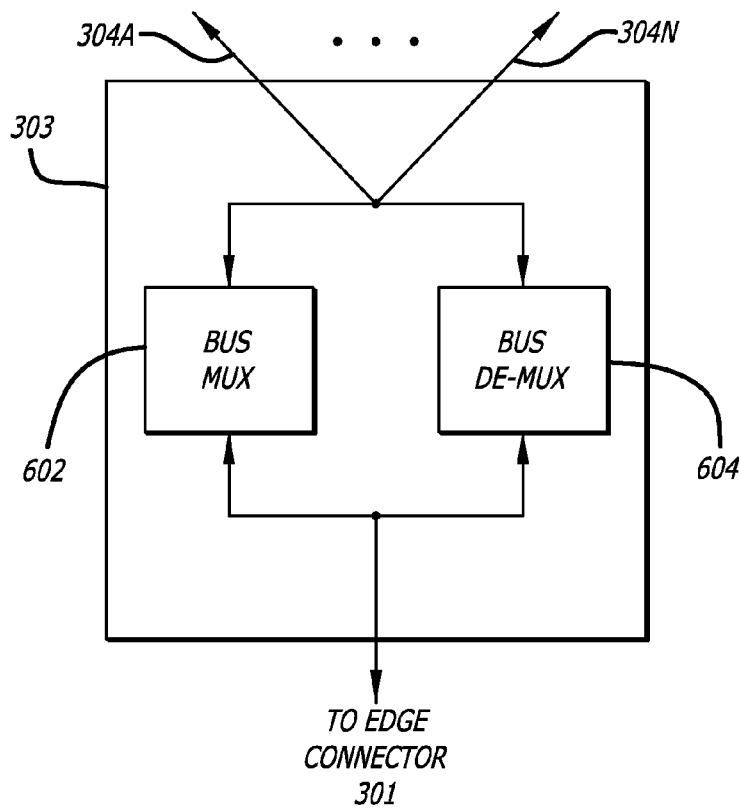
FIGS. 6A-6B are functional block diagrams of implementations of a buffer IC.

Referring now to FIG. 6A in accordance with one configuration, each of the plurality of buffer integrated circuits 303 includes a many-to-one bus multiplexer 602 and a one-to-many bus demultiplexer 604. The many-to-one bus multiplexer 602 is used to write data onto a data bus at the edge connection 301. The one-to-many bus demultiplexer 604 is used to read data from the data bus at the edge connection 301 onto one of many data buses 304A-304N coupled to the memory integrated circuits 302A-302N.

Figure 6B:
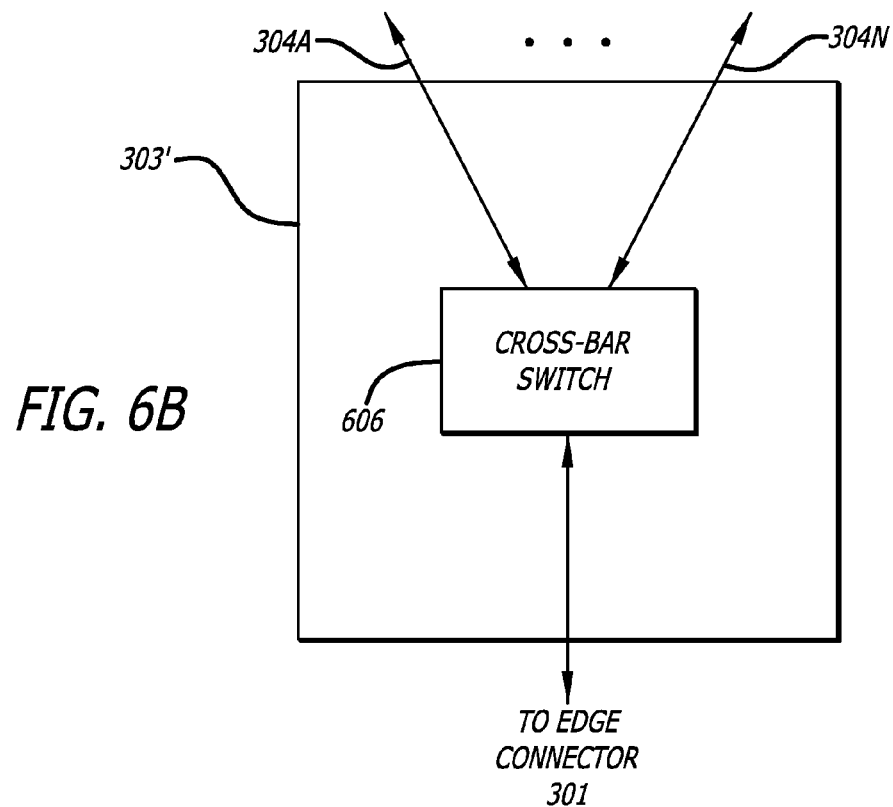

Referring now to FIG. 6B, in accordance with another configuration, each of the plurality of buffer integrated circuits 303' instead includes a cross-bar switch 606 coupled between the plurality of data busses 304A-304N connected to the memory integrated circuits 302A-302N and a data bus at the edge connection 301. The cross bar switch 606 is used to write data onto the data bus at the edge connection 301 from the memory integrated circuits 302A-302N. The cross bar switch 606 is used further to read data from the data bus at the edge connection 301 and couple the data onto one of data buses 304A-304N connected to the memory integrated circuits 302A-302N.

Figure 4:
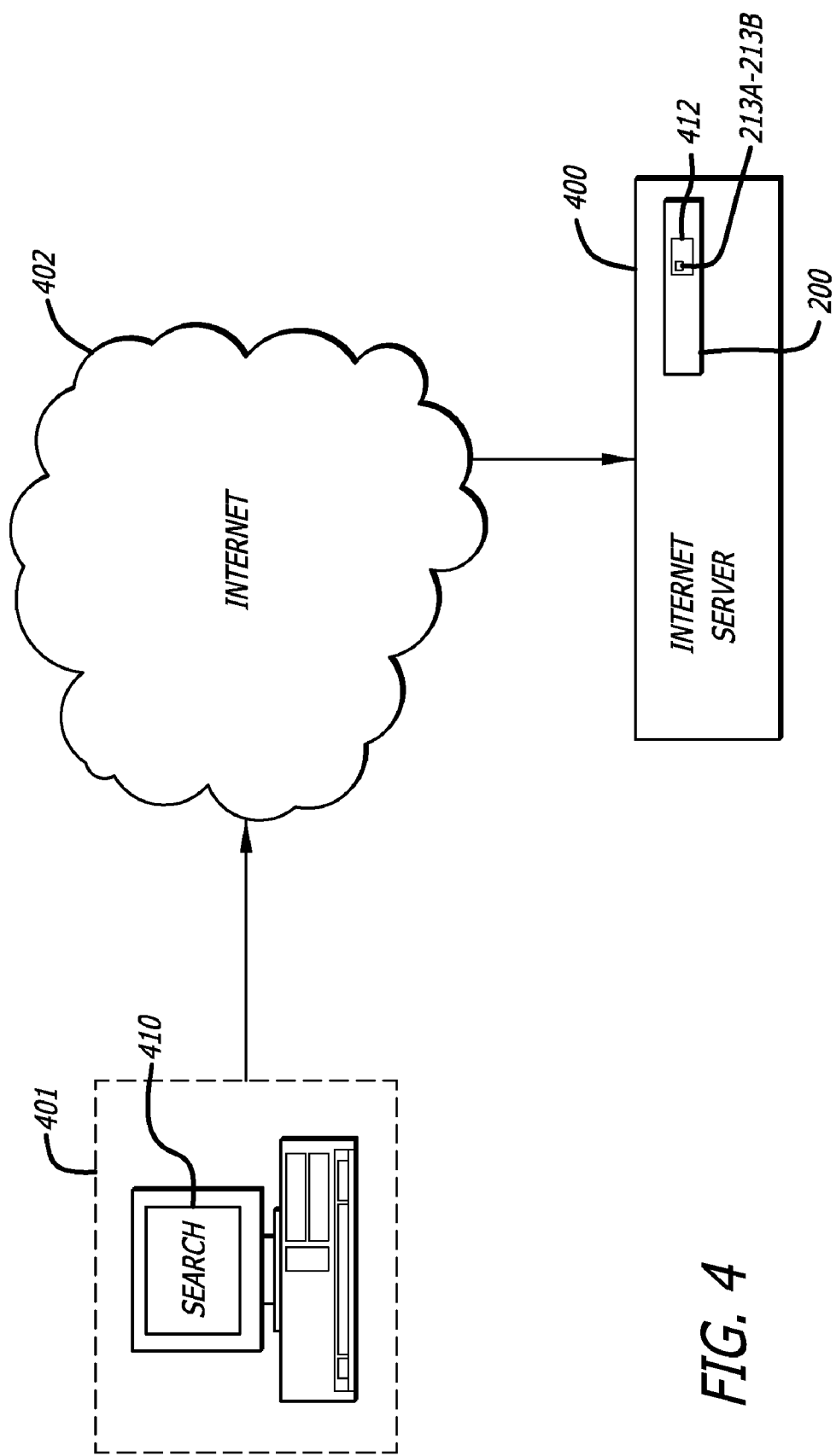
FIG. 4 is a functional block diagram of an internet server coupled to the internet.

Referring now to FIG. 4, a block diagram of an internet server 400 and a remote client 401 coupled to the internet 402 is illustrated. The internet server 400 includes the motherboard 200 that has been upgraded to include non-volatile memory modules plugged into the memory module sockets of one or more memory channels.

An example of the use of non-volatile memory modules in main memory is now described. The remote client 401 executes a search query 410 against a search engine running on the internet server 400 to search for data. In this case, the main memory 412 on the mother board 200 may be more often read that it is written. Non-volatile memory modules may be plugged into one or more sockets of one or more memory channels. With the mother board 200 upgraded to include non-volatile memory modules in its main memory 412, power is conserved over that of a main memory solely having DRAM memory modules.

Figure 7:
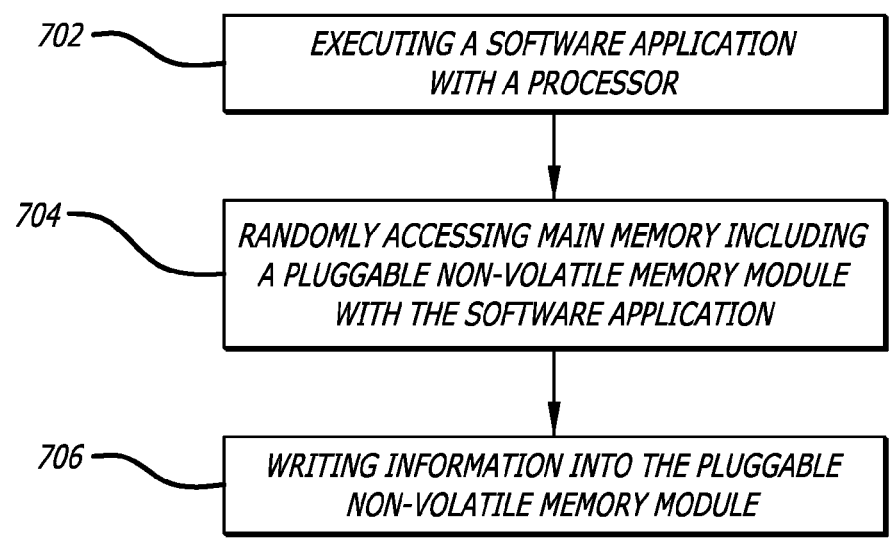
FIG. 7 is a flow chart of a method for accessing main memory including a pluggable non-volatile memory module.

Referring now to FIG. 7, a method in a server with a main memory including a pluggable non-volatile memory module is illustrated.

At block 702, a software application is executed with a processor.

At block 704, the main memory of the server is randomly accessed by the software application. As previously mentioned, the main memory includes a pluggable non-volatile memory module. The pluggable non-volatile memory module may have a read access time substantially similar to a DRAM memory module (e.g., approximately twice the read access time of a DRAM memory module). However, the write access time of the pluggable non-volatile memory module may differ from the write access time of a DRAM memory module.

At block 706, information is written into the pluggable non-volatile memory module. The information that is written into the pluggable non-volatile memory module may include data and/or code. Writing information into the pluggable non-volatile memory module may be in response to executing the software application. In one configuration, the software application writes the information into the memory module.

In this configuration, the software application may be a search engine to search for data on a server, such as the internet server previously mentioned.

When implemented in software, the memory controller may include code segments configured to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

While certain configurations are described and shown in the accompanying drawings, it is to be understood that such configurations are merely illustrative of and not restrictive of the scope of the disclosure. Other implementations are within the scope of the following claims. For example, the memory modules and the memory sockets have been described as being dual in-line memory modules (DIMM) and DIMM sockets. However, the memory modules and memory sockets may have other types of form factors such as single in-line memory modules (SIMM), for example.

What is claimed is:

1. A system comprising:
    a motherboard having processor sockets coupled to memory module sockets in one or more memory channels via printed circuit board traces, each of the processor sockets configured to receive a processor and each of the memory module sockets configured to receive a memory module;
    one or more processors plugged into some but less than all of the processor sockets such that at least one processor socket is without a processor, each of the one or more processors including one or more processing cores; and
    at least one memory controller plugged into the at least one processor socket without a processor, the at least one memory controller configured to control random read and write accesses of data to memory other than volatile memory in at least one of the one or more memory channels.

2. The system of claim 1, further comprising:
    at least one non-volatile memory module respectively plugged into at least one of the memory module sockets in the one or more memory channels.

3. The system of claim 2, wherein
    the memory module sockets are dual in-line memory module (DIMM) sockets, and
    the at least one non-volatile memory module is a non-volatile dual in-line memory module.

4. The system of claim 2, wherein
    at least one memory device of the non-volatile memory module is a NOR flash electrically erasable programmable read only memory (EEPROM) integrated circuit chip.

5. The system of claim 2, wherein
    the at least one memory controller is a non-volatile memory controller.

6. The system of claim 1, wherein
    the at least one memory controller is a dual memory controller and is further configurable to control read and write accesses of data to dynamic random access memory in at least another one of the one or more memory channels.

\* \* \* \* \*